US009180982B2

(12) United States Patent
Baghdasarian

(10) Patent No.: US 9,180,982 B2
(45) Date of Patent: Nov. 10, 2015

(54) PRELOAD RELEASING FASTENER AND RELEASE SYSTEM USING SAME

(75) Inventor: Varouj G. Baghdasarian, Cupertino, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 883 days.

(21) Appl. No.: 13/215,229

(22) Filed: Aug. 23, 2011

(65) Prior Publication Data

US 2012/0076614 A1 Mar. 29, 2012

Related U.S. Application Data

(60) Provisional application No. 61/386,568, filed on Sep. 27, 2010.

(51) Int. Cl.
*F16B 33/00* (2006.01)
*B64G 1/22* (2006.01)
*F16B 31/00* (2006.01)

(52) U.S. Cl.
CPC .............. *B64G 1/222* (2013.01); *F16B 31/005* (2013.01); *Y10T 403/21* (2015.01)

(58) Field of Classification Search
CPC ....... B64G 1/222; F16B 31/005; F16B 33/00; Y10T 403/21
USPC ...................................... 411/427, 909, 366.1
See application file for complete search history.

(56) References Cited

U.S. PATENT DOCUMENTS

| | | | | |
|---|---|---|---|---|
| 4,450,616 | A * | 5/1984 | Morita | 411/909 |
| 5,316,319 | A * | 5/1994 | Suggs | 411/544 |
| 5,578,034 | A * | 11/1996 | Estes | 411/909 |
| 2005/0169728 | A1* | 8/2005 | Attanasio | 411/352 |
| 2006/0002783 | A1* | 1/2006 | Rudduck et al. | 411/107 |

OTHER PUBLICATIONS

Introduction to Shape Memory Alloys, 3 pages, available at http://www.tinialloy.com/pdf/introductiontosma.pdf, earliest web archive date: Jun. 2, 2004.*

Donohue, “Developing a Good Memory” Nitinol Shape Memory Alloy, Today’s Machining World, 7 pp. Mar. 2009.

* cited by examiner

*Primary Examiner* — Roberta Delisle

(74) *Attorney, Agent, or Firm* — Weaver Austin Villeneuve & Sampson

(57) ABSTRACT

A preload reducing fastener adapted to be fastened into a system in which includes a release system. The fastener may have an integral collar which is adapted to change shape, as in the case of a shape memory alloy. The application of heat to fastener may deform the collar such that the fastener may move axially in the load direction, thus reducing the preload previously held by the fastener. A preload reducing device including a preload reducing fastener may include an outer case adapted to center and capture a preload reducing fastener. The case may center the fastener in a desired location in a preloaded system, and may also capture the fastener after release of the system.

21 Claims, 4 Drawing Sheets

107 106 105 102 111 109 103 110 100 104 135 104 101 113 112 132 131 130 100 135

PRELOAD RELEASING FASTENER AND RELEASE SYSTEM USING SAME

CROSS-REFERENCE TO RELATED APPLICATIONS

This application claims priority to U.S. Provisional Patent Application No. 61/386,568 to Baghdasarian, filed Sep. 27, 2010.

BACKGROUND

1. Field of the Invention

The present invention relates to a preload releasing fastener which may be used in systems which release such items as antennas, solar arrays, positioning mechanisms, and other devices.

2. Description of Related Art

A release apparatus may be used to release a captured member which constrains the deployment of a spacecraft element, such as a solar array and/or reflectors, in the stowed position. In many prior art devices, the spacecraft element was restrained with a wire or a holddown rod system which was released using a pyrotechnic device. Typically, the pyrotechnic device would fire an anvil against a base, with the wire or rod to be cut and released. Although useful in many applications, these devices imparted high shock loads into the units which they were to release, as well as the spacecraft itself. One aspect of the shock imparted into the system involves the shock due to the pyrotechnic device, and another aspect of the shock involves the sudden release of a tensioned system, and the motions involved therein. In some systems, the tensioned system release allows for quick motions of the release system, which are then constrained by motion limiters, and shocks are felt as the moving parts hit mechanical stops.

A design that avoided the shocks associated with pyrotechnic release devices was the separation spool device, which used a fused element to release a captured member. U.S. Pat. No. 6,133,818, to Baghdasarian, discusses a release apparatus wherein two piece split spool with an annulus is used to capture a capture member larger in diameter than the annulus of the spool. The two pieces of the split spool are held together with a wire that is wrapped around the spool.

However, other methods of reducing the shocks associated with releases of hold downs can be used.

SUMMARY

A preload reducing fastener adapted to be fastened into a system in which includes a release system. The fastener may have an integral collar which is adapted to change shape, as in the case of a shape memory alloy. The application of heat to fastener may deform the collar such that the fastener may move axially in the load direction, thus reducing the preload previously held by the fastener.

A preload reducing device including a preload reducing fastener may include an outer case adapted to center and capture a preload reducing fastener. The case may center the fastener in a desired location in a preloaded system, and may also capture the fastener after release of the system.

DETAILED DESCRIPTION

Figure 1:
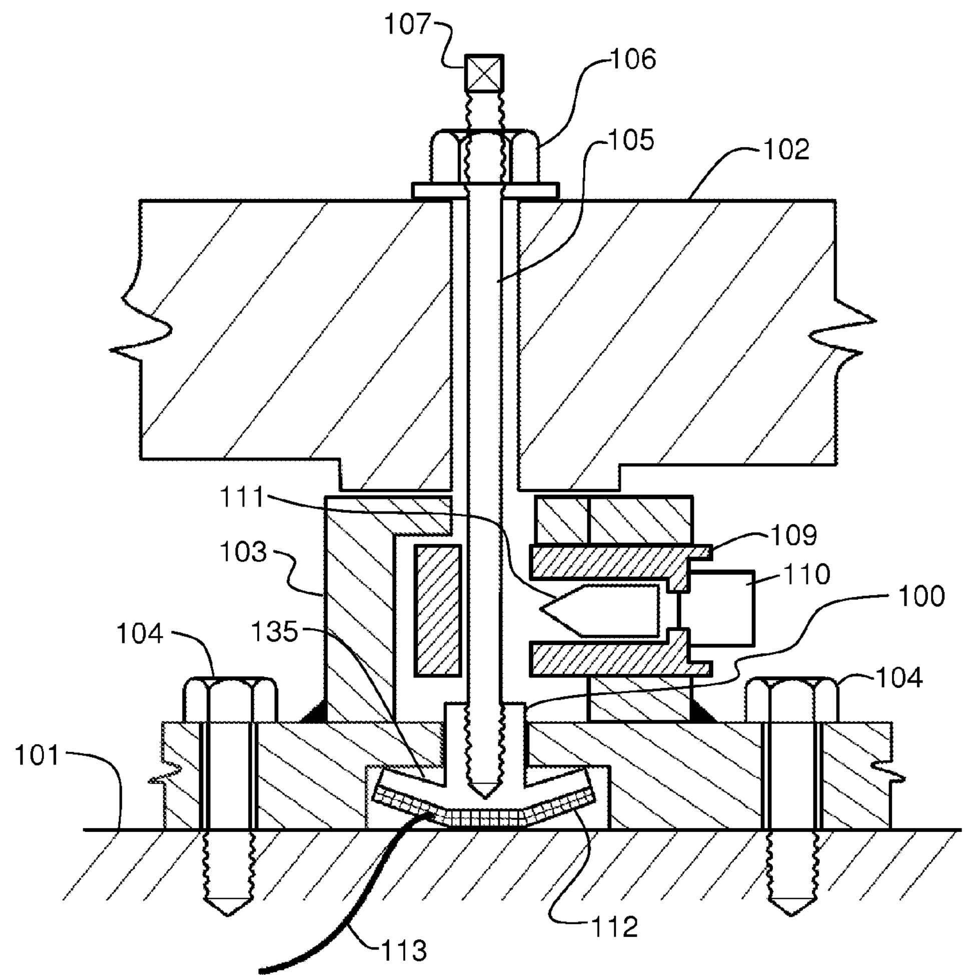
FIG. 1 is a cross-sectional view of a release device and system according to some embodiments of the present invention.

In some embodiments of the present invention, as seen in FIG. 1, an item to be deployed 102 is seen held down to a surface 101. In some aspects, the item to be deployed 102 may be a solar array panel, an antenna, or other item. In some aspects, the surface 101 may be a spacecraft sidewall. When used during spacecraft launch, a tensioned release device may allow for sufficient holding force of a deployable object, and be used in enough positions, such that the item to be deployed is able to withstand launch loads without damage. A variety of hold-down locations may be used to not only provide strength but to alter, or lower, the frequency of the non-deployed (stowed) system during launch.

In some aspects, the item 102 may need to be deployed after launch in order to perform its mission tasks. For example, a solar array panel, which may have been part of a stowed array of panels, may need to be deployed in order to become part of a deployed array of panels in order to provide electrical power to a spacecraft's payload and electronics. However, in order to have successfully withstood launch loads, the item 102 may have needed to have been held in place during launch with a pre-loaded fastening system. If the preloaded fastening system used a rod in tension, for example, this rod may be cut using a pyrotechnic device adapted to accelerate n knife-like implement into and through the rod. The tension in the rod may, upon cutting of the rod, result in a shock due to the sudden de-tensioning of the rod. In some aspects of the present invention, the rod is de-tensioned as discussed below.

In some embodiments of the present invention, a cutter mounting bracket 103 acts as an apparatus housing and is mounted to a sidewall 101 using fasteners 104. The cutter mounting bracket 103 may have a base with holes adapted to route the fasteners 104 through the base and into threaded receivers mounted within the sidewall 101. A pyrotechnic cutter 109 may be adapted to fit within the cutter mounting bracket 103. A pyrotechnic squib 110 may be used to power a knife-like cutter 111 through a rod 105 used to retain a deployable item 102. The pyrotechnic cutter 109 may be a removable item such that the cutter mounting bracket may be re-used with a new cutter 109, which may be replaced after system testing, for example.

In order to impart a desired preload into the rod 105, the system is designed such that the rod 105 can be preloaded via the torque imparted by the tightening of a nut 106. In some embodiments other preload inducing means may be used. The rod 105 is fastened on a first end into a preload reducing fastener 100. The preload reducing fastener 100 is adapted to receive the threaded end of the first end of the rod 105 in an internally threaded hole. The nut 106 is placed on the second end of the rod 105 and the rod may be loaded into axial tension by the turning of the nut 106. A flat 107 on the end of the rod 105 may be used to prevent the rod 105 from turning within the preload reducing fastener 100 during the tightening of the nut 106. In some embodiments, the rod 105 is inserted into the preload reducing fastener 100 a prescribed number of turns, and then is held at that depth within the preload reducing fastener 100 with a tool on the flat 107 while the nut 106 is tightened. In some embodiments, the nut 106 is tightened to a particular torque. In some embodiments, the nut 106 is tightened a prescribed number of turns.

In some embodiments of the present invention, the preload reducing fastener 100 is adapted to provide sufficient resistance and strength to maintain the desired preload imparted into the rod 105, and also to release some of, or all of, the preload in the rod. The preload reducing fastener 100 may have a collar 135 which is adapted to have a first configuration at a first temperature, such as room temperature, and a second configuration at a second temperature, such as an elevated temperature. A heater 112 may be attached to the bottom of the preload reducing fastener 100. The heater 112 may be a resistance heater and may be supplied electrical current via wires 113. In some embodiments, other heating means may be used.

Figure 2:
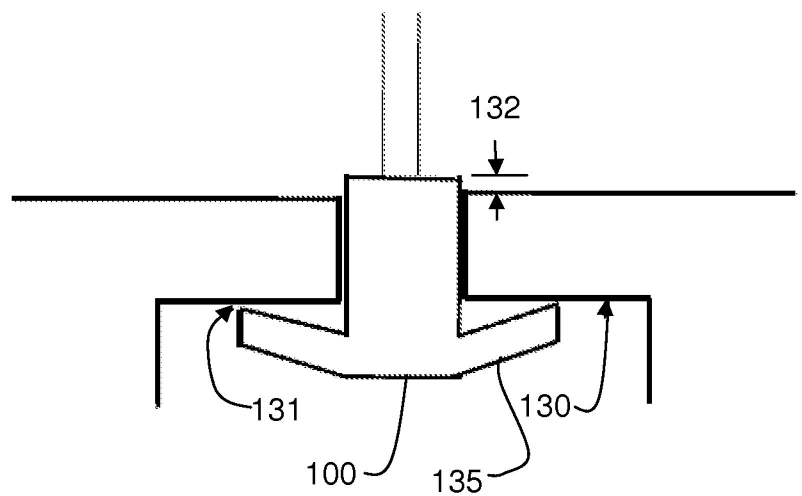
FIG. 2 is a side view of a release device in its tensioned position according to some embodiments of the present invention.
Figure 3:
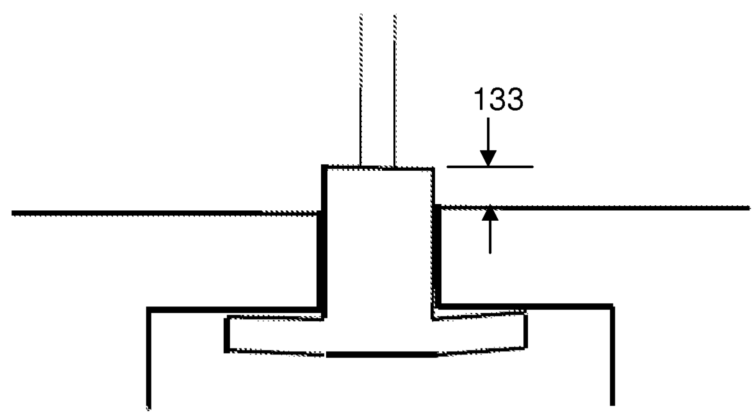
FIG. 3 is a side view of a release device in its relaxed position according to some embodiments of the present invention.

In some embodiments of the present invention, as seen if FIGS. 2 and 3, the preload reducing functionality allows for axial shift of the threaded interface of the preload reducing fastener 100. As seen in FIG. 2, the collar 135 of the preload reducing fastener 100 may contact the surface 130 of the cutter mounting bracket 103 at contact region 131. The contact region 131 may be a circle around the outside of the collar 135. The height 132 of the threaded interface in this tensioned configuration may be the height used when the system is tensioned to the desired preload.

In some embodiments of the present invention, as seen in FIG. 3, the collar 135 is seen to have "flattened." The height 133 of the threaded interface is now larger, representing an axial shift in the position of the preload reducing fastener.

In some embodiments, the collar 135 of the preload reducing fastener 100, or the entire preload reducing fastener 100, may be made of a shape memory alloy. The shape memory alloy may be set such that the fastener 100 retains a first tensioned configuration at a first temperature, and takes a second relaxed configuration at a second temperature, which may be a higher temperature imparted to the fastener 100 by the heater 112. In some embodiments, the material may be nitinol. A superelastic material, such as Nitinol (NiTi) may exhibit elasticity over large levels of strain. The increased flexibility obtained in these materials by undergoing large elastic strain can improve their performance. At low levels of stress, the material exits in an austenite phase. Upon further loading, the material undergoes a stress-induced transformation from the austenite phase to a martensite phase. The material behaves as linear elastic in both austenite and martensite phases, however, the modulus of elasticity in the two phases is different. During the stress-induced transformation from austenite to martensite there is very little change in stress, but a large increase in strain. Beyond the transition region in the martensite phase ultimately results in permanent unrecoverable set in the material, while unloading for cases that do not reach the transformation state follow the elastic modulus.

By heating the collar of the fastener such that there is an axial shift in the position of the fastener, the preload in the rod 105 may be reduced or eliminated. In some aspects, this lower (or zero) preload may result in a lower set of shock loads into the system when the cutter is used to cut the rod 105.

Figure 4:
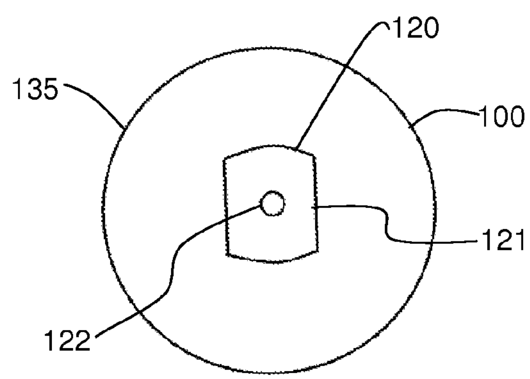
FIG. 4 is a top view of a preload releasing fastener according to some embodiments of the present invention.

In some embodiments of the present invention, as seen in FIG. 4, the preload reducing fastener 100 may be adapted to withstand rotary loads while mounted in its mounting bracket. The axial portion 120 of the fastener 100 may have flats 121 along its sides such that instead of the axial portion being round, and inserted through a round hole, the axial portion instead has flats which prevent the fastener 100 from rotating when rotating loads are placed on it via its threaded interface 122. Thus, when the rod 105 is tensioned via the nut 106, the fastener 100 may be held firmly in place with regard to rotary displacement. An advantage of embodiments of the present invention is that in the case wherein the fastener is rotationally constrained, a single piece, the preload reducing fastener 100, may be used as an anchor for a tensioned rod, as a preload release device, and as rotational constraint for tightening of the rod. Further, when the preload reducing fastener is constrained by the housing, and mounted below the housing but between the housing and the sidewall, the fastener is inherently constrained after the cutting of the rod.

In some embodiments, an item to be deployed is stowed using a preloaded rod. The rod is fastened on one end using a preload reducing fastener. After launch, a heater may be used to reduce the preload in the rod by heating the preload reducing fastener such that its collar relaxes and the fastener has an axial shift in position. The cutter may then be fired. The item may then be deployed.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

I claim:

1. A release apparatus for controlling the deployment of a device by releasably restraining a first member under tension in a first direction to prevent deployment of the device, the release apparatus comprising:

a tensioning rod, said tensioning rod adapted to restrain said first member along said first direction; and a preload-reducing fastener fastened to a first end of said tensioning rod, the preload-reducing fastener including:

a central body; and a collar around the central body, wherein the collar is made from a shape memory alloy and is transitionable from a first configuration to a second configuration by inducing a phase change in the shape memory alloy through the application of heat to the collar, and wherein:

in the first configuration:

the collar is at least partially defined by two frusto-conical surfaces extending away from the central body, the collar has a first length along a center axis of the central body, and the two frusto-conical surfaces are offset from one another and slope in the same direction; and in the second configuration:

the frusto-conical surfaces are flatter than in the first configuration, and the collar has a second length along the center axis that is less than the first length.

2. The release apparatus of claim 1, wherein the preload-reducing fastener is adapted to change configuration upon application of heat.

3. The release apparatus of claim 2, wherein the preload-reducing fastener is made from the shape memory alloy.

4. The release apparatus of claim 1, wherein the shape memory alloy includes nitinol.

5. The release apparatus of claim 1, wherein the collar is adapted to change shape with the application of heat.

6. The release apparatus of claim 1, further comprising a heater, the heater attached to the preload-reducing fastener and adapted to heat the collar.

7. The release apparatus of claim 6, further comprising:
a main housing; and
a cutter assembly.

8. The release apparatus of claim 7, wherein the cutter assembly comprises a hole adapted to receive the tensioning rod, and wherein the main housing comprises:
an exit hole for the tensioning rod;
a receiver for the cutter assembly; and
a mounting slot for the preload-reducing fastener,
wherein the hole in the cutter assembly, the exit hole, and the mounting slot for the preload-reducing fastener are coaxial along a first axis.

9. The release apparatus of claim 8, wherein the central body of the preload-reducing fastener and the mounting slot in the main housing comprise mating features adapted to constrain rotation of the preload-reducing fastener about the first axis with respect to the main housing.

10. The release apparatus of claim 9, wherein the external surface of the central body of the preload-reducing fastener is nominally cylindrical and includes at least one flat surface that is parallel to the center axis of the cylinder.

11. The release apparatus of claim 1, wherein the preload-reducing fastener further comprises an internally-threaded hole in the central body.

12. A preload-reducing fastener, the preload-reducing fastener comprising:
a central body; and
a collar around the central body, wherein the collar is made from a shape memory alloy and is transitionable from a first configuration to a second configuration by inducing a phase change in the shape memory alloy through the application of heat to the collar, and wherein:
in the first configuration:
the collar is at least partially defined by two frusto-conical surfaces extending away from the central body,
the collar has a first length along a center axis of the central body, and
the two frusto-conical surfaces are offset from one another and slope in the same direction; and
in the second configuration:
the frusto-conical surfaces are flatter than in the first configuration, and
the collar has a second length along the center axis that is less than the first length.

13. The preload-reducing fastener of claim 12, wherein the preload-reducing fastener is made from the shape memory alloy.

14. The preload-reducing fastener of claim 12, wherein the shape memory alloy comprises nitinol.

15. The preload-reducing fastener of claim 12, further comprising a heater, the heater adapted to heat the collar.

16. The preload-reducing fastener of claim 15, wherein the collar is adapted to change shape with the application of heat.

17. The preload-reducing fastener of claim 12, further comprising an internally-threaded hole within the central body, wherein the external surface of the central body comprises one or more external anti-rotation features.

18. The preload-reducing fastener of claim 17, wherein the external surface of the central body is nominally cylindrical and the one or more external anti-rotation features include at least one flat surface that is parallel to the center axis of the cylinder.

19. The preload-reducing fastener of claim 17, wherein the collar is adapted to change shape with the application of heat.

20. The preload-reducing fastener of claim 12, further comprising an internally-threaded hole in the central body.

21. A preload reducing fastener, the preload reducing fastener comprising:
a collared nut, the collared nut comprising:
a central body;
an internally-threaded hole within the central body; and
a collar around the central body, wherein the collar is made from a shape memory alloy and is transitionable from a first configuration to a second configuration by inducing a phase change in the shape memory alloy through the application of heat to the collar, and wherein:
in the first configuration:
the collar is at least partially defined by two frusto-conical surfaces extending away from the central body,
the collar has a first length along a center axis of the central body, and
the two frusto-conical surfaces are offset from one another and slope in the same direction, and
in the second configuration:
the frusto-conical surfaces are flatter than in the first configuration, and
the collar has a second length along the center axis that is less than the first length.

* * * * *